(12) United States Patent
Welter et al.

(10) Patent No.: US 6,283,266 B1
(45) Date of Patent: Sep. 4, 2001

(54) HYDRAULIC CLUTCH RELEASE MECHANISM

(75) Inventors: Roland Welter, Bühl; Gerhard Meyer, Lehrberg; Ludwig Winkelmann, Erlangen, all of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/591,676

(22) Filed: Jun. 8, 2000

Related U.S. Application Data (63) Continuation of application No. PCT/EP98/06627, filed on Oct. 21, 1998.

(30) Foreign Application Priority Data

Dec. 10, 1997 (DE) ............................................... 197 54 702

(51) Int. Cl.$^7$ .................................................... F16D 25/08
(52) U.S. Cl. .................................. 192/85 R; 192/85 CA; 192/91 A
(58) Field of Search .............................. 192/85 R, 85 C, 192/85 CA, 91 R, 91 A; 285/305, 321; 60/533, 584

(56) References Cited

U.S. PATENT DOCUMENTS

| | | |
|---|---|---|
| 4,601,374 | 7/1986 | Ladin . |
| 4,991,627 * | 2/1991 | Nix .................................. 137/614.03 |
| 5,108,135 | 4/1992 | Mercardo . |
| 5,113,657 | 5/1992 | Compton et al. . |
| 5,779,019 * | 7/1998 | Grosspietsch et al. ............ 192/85 C |
| 5,879,599 | 3/1999 | Inou et al. . |
| 6,016,898 * | 1/2000 | Duquesnes ......................... 192/85 R |
| 6,019,204 * | 2/2000 | Meyer ............................. 192/85 CA |

* cited by examiner

Primary Examiner—Richard M. Lorence
(74) Attorney, Agent, or Firm—Darby & Darby (57) ABSTRACT

A hydraulic clutch release mechanism has a clutch pedal-operated master cylinder connected with the clutch release member (such as a fork or a bearing) by way of a conduit or by way of a slave cylinder and a conduit. The sealing but separable connection between at least one of the cylinders and the respective conduit comprises a T-shaped fitting having a first section sealingly connected with an end portion of the respective conduit and a second section coupled to the housing of the at least one cylinder by snap action. The fitting further carries a relief valve which opens when the pressure of hydraulic fluid in a plenum chamber of the at least one cylinder rises to a preselected value. The fitting and/or the housing and/or the body of the valve and/or the end portion of the conduit consists of or contains a suitable plastic material, such as polyamide.

24 Claims, 4 Drawing Sheets

HYDRAULIC CLUTCH RELEASE MECHANISM

This is a continuation of International Application No. PCT/EP98/06627, filed on Oct. 21, 1998.

BACKGROUND OF THE INVENTION

The present invention relates to hydraulic clutch release mechanisms which can be utilized in the power trains or drive trains of motor vehicles to transfer clutch pedal action to the fork or release bearing of the clutch. As disclosed, for example, in "Modern Automotive Technology", authored by James E. Duffy and published by the Goodheart-Willcox Company, Inc., Tinley Park, Ill., a hydraulic clutch release mechanism normally comprises three basic parts, namely, a clutch master cylinder (also called clutch cylinder), a hydraulic line and a slave cylinder.

A hydraulic clutch release mechanism replaces earlier types of clutch release mechanisms including those wherein a Bowden wire is employed to transmit motion from the clutch pedal to the release member (such as a fork) for a friction clutch. Depression of the clutch pedal, which is operatively connected with a clutch release member by a hydraulic release mechanism, entails the actuation of the master cylinder (the pressure of hydraulic fluid in the plenum chamber of the master cylinder rises), and the piston of the master cylinder expels pressurized hydraulic fluid, by way of the hydraulic line, into the plenum chamber of the slave cylinder. The piston of the slave cylinder is caused to perform a stroke which results in disengagement of the clutch by way of the aforementioned clutch release member.

A drawback of presently known hydraulic clutch release mechanisms is that the installing of the hydraulic line, the installing of various connections between the hydraulic line and at least one of the cylinders, and the installing of fluid-conveying connections between the cylinders, are time-consuming procedures primarily due to lack of space under the hood of a motor vehicle. Moreover, a hydraulic line cannot be bent to any desired extent, and this also contributes to the space requirements of conventional hydraulic clutch release mechanisms, not only in fully assembled and installed condition of the release mechanism but also (and often especially) during mounting of conventional release mechanisms in the power trains of motor vehicles. Heretofore known proposals to cope with the above outlined problems include the utilization of specially designed elbows, adapters, tees and analogous complex, costly and often bulky components.

U.S. Pat. No. 4,601,374 (granted Jul. 22, 1986 to Ladin for "HYDRAULIC CLUTCH PISTON AND SEAL") discloses a hydraulic clutch release mechanism which comprises the above-enumerated constituents; however, the patentee is not concerned with and does not discuss the manner of assembling the constituents and of installing them in a motor vehicle. The connection between the master and slave cylinders comprises a threaded joint. The hydraulic line between the two cylinders has an end portion extending radially of the housing of one of the cylinders, and an arcuate second portion adjacent the end portion. The space requirements of the just described hydraulic line are quite pronounced so that such clutch release mechanisms cannot be put to use in numerous types of vehicles, especially those embodying front wheel drives. Moreover, the mounting of such mechanisms in those vehicles which provide adequate space to accommodate a hydraulic line with the aforedescribed radially extending and arcuate sections is a complex and time-consuming operation.

U.S. Pat. No. 5,108,135 (granted Apr. 28, 1992 to Mercado for "FIBER REINFORCED PLASTIC PIPE TEE") discloses a fitting which can be put to use in certain types of hydraulic clutch release mechanisms. However, this patent fails to disclose any solutions how to approach the problems which arise in connection with the assembly of the constituents of a clutch release mechanism and/or in connection with the installation of an at least partially assembled release mechanism in a motor vehicle.

U.S. Pat. No. 5,113,657 (granted May 19, 1992 for "MODULAR HYDRAULIC CONTROL APPARATUS" to Compton et al.) discloses a hydraulic release mechanism employing modular quick-connect members which include one-way locking arrangements. This patent also fails to offer effective and generally useful solutions of the aforediscussed problems arising in connection with the utilization of conventional hydraulic clutch release mechanisms.

The disclosures of our German priority application Serial No. 197 54 702.8 (filed Dec. 12, 1997) and of all U.S. and foreign patents and patent applications identified in the specification of the present application are incorporated herein by reference.

OBJECTS OF THE INVENTION

An object of the present invention is to provide novel and improved connections between the constituents of a hydraulic clutch release mechanism for use in the power trains of motor vehicles.

Another object of the invention is to provide a hydraulic clutch release mechanism which is more compact and less expensive than heretofore known and utilized hydraulic clutch release mechanisms.

A further object of the invention is to provide novel and improved component parts and combinations of component parts, such as couplings, fittings or the like, for use in the above outlined clutch release mechanism.

An additional object of the invention is to provide novel and improved materials and combinations of materials for use in the making of certain constituents of a hydraulic clutch release mechanism.

Still another object of the invention is to provide novel and improved equipment for use in connection with the making and/or assembling or joining of constituents of the above outlined clutch release mechanism.

A further object of the invention is to provide a novel and improved method of assembling the constituents of the above outlined hydraulic clutch release mechanism.

Another object of the invention is to provide a novel and improved substantially T-shaped fitting for use in the above outlined clutch release mechanism.

An additional object of the invention is to provide a power train which embodies the above outlined hydraulic clutch release mechanism.

Still another object of the invention is to provide a clutch release mechanism which constitutes an improvement over and a further development of mechanisms disclosed in the aforementioned U.S. '374 patent to Ladin and/or in the aforementioned U.S. '657 patent to Compton et al.

SUMMARY OF THE INVENTION

The invention is embodied in a hydraulic clutch release mechanism which comprises a cylinder having a piston reciprocable in a cylinder housing which defines a plenum chamber, a conduit (such as a hydraulic line), and a quick-connect coupling between the conduit and the housing. The coupling includes a fitting (such as a tee) having a channeled first section communicatively connected with an end portion of the conduit and a channeled second section that is inclined relative to and communicates with the channeled first section (and hence with the conduit), and a channeled third section which is provided on the cylinder housing. One of the second and third sections is a female section which sealingly but preferably separably receives the other of the second and third sections (i.e., the male section) and establishes therewith a path for the flow of fluid between the plenum chamber in the housing of the cylinder and the conduit by way of the first section of the fitting.

The cylinder can constitute a master cylinder which is actuatable by the clutch pedal or a slave cylinder which is actuated by a master cylinder. Alternatively, the third section of the coupling can include or constitute an adapter which is affixed to or is of one piece with the housing of the master or slave cylinder.

If the fitting is a tee, the first section forms part of the run and the second section forms part of or includes or constitutes the branch of the tee. As concerns the terms "run" and "branch", reference may be had to the glossary in column 4, lines 4–30 of the U.S. '135 patent to Mercado.

The release mechanism can also comprise a relief valve which is or can be installed in the run of the tee at the end opposite that which is sealingly connected with the end portion of the conduit. The relief valve is arranged to open in response to a rise of fluid pressure in the channels of the first and second sections of the fitting above a preselected value.

The conduit and/or the fitting can contain or can be made of a suitable plastic material. Furthermore, the conduit and/or the fitting can constitute an injection molded part. For example, the conduit can consist of polyamide and the fitting can be made of fiber-reinforced polyamide. Thus, the fitting and the conduit may be made of identical plastic materials.

The first section of the fitting and/or the end portion of the conduit can be provided with means for nonseparably connecting the conduit to the fitting. For example, the fitting can constitute an injection molded part made in a machine having a composite (multi-piece) injection molding tool which is provided with suitable means for centering the end portion of the conduit prior to molding the first section around the thus centered end portion of the conduit. The just discussed tool of the injection molding machine for the making of the fitting can further include means for molding a portion of the fitting around a portion of the aforediscussed relief valve, for providing a second portion (such as the aforementioned first section) with a recess for the end portion of the conduit, and for providing the fitting with paths for the flow of hydraulic fluid between the channels of the first and second sections as well as between at least one of these just mentioned channels and the relief valve.

The outer diameter of the end portion of the conduit can be less than the depth of the aforementioned recess in the first section of the fitting; for example, the outer diameter D of the end portion of the conduit can be only slightly less than the depth I of the recess in the first section of the fitting.

It is also possible to employ a conduit which includes a metallic pipe and a plastic envelope (in the form of a layer or film) surrounding the metallic pipe.

It is often preferred to make the end portion of the conduit and at least the first section of the fitting of a weldable plastic material, particularly a material which permits satisfactory ultrasonic welding of the end portion of the conduit to the first section of the fitting. The end portion of the conduit is or can be corrugated (or similarly expanded) as a result of a radially outwardly oriented treatment such as upsetting and/or stretching. The end portion of the conduit or the first section of the fitting can be provided with at least one external projection which is snugly received in the internal socket(s) of the other of these parts. For example, the at least one external projection can be a circumferentially complete collar surrounding the end portion of the conduit or being surrounded by the internal surface in the recess of the first section of the fitting.

The end portion of the conduit and the first section of the fitting can be dimensioned and configured in such a way that they can be interfitted by snap action.

It is also possible to design the novel coupling in such a way that one of the second and third sections of the coupling is provided with a discrete (e.g., separately produced) retainer and the other of these sections has a socket receiving the retainer by snap action in response to insertion of the male part (second or third section) into the female part (third or second section).

The relief valve can comprise an externally threaded valve body made of a suitable plastic material, and the fitting can be provided with a tapped hole or bore which receives the externally threaded valve body. Such release mechanism preferably further comprises at least one suitable annular sealing element which is received in the hole and normally sealingly engages the fitting and the valve body.

The novel features which are considered as characteristic of the invention are set forth in particular in the appended claims. The improved clutch release mechanism itself, however, both as to its construction and the modes of making, assembling and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
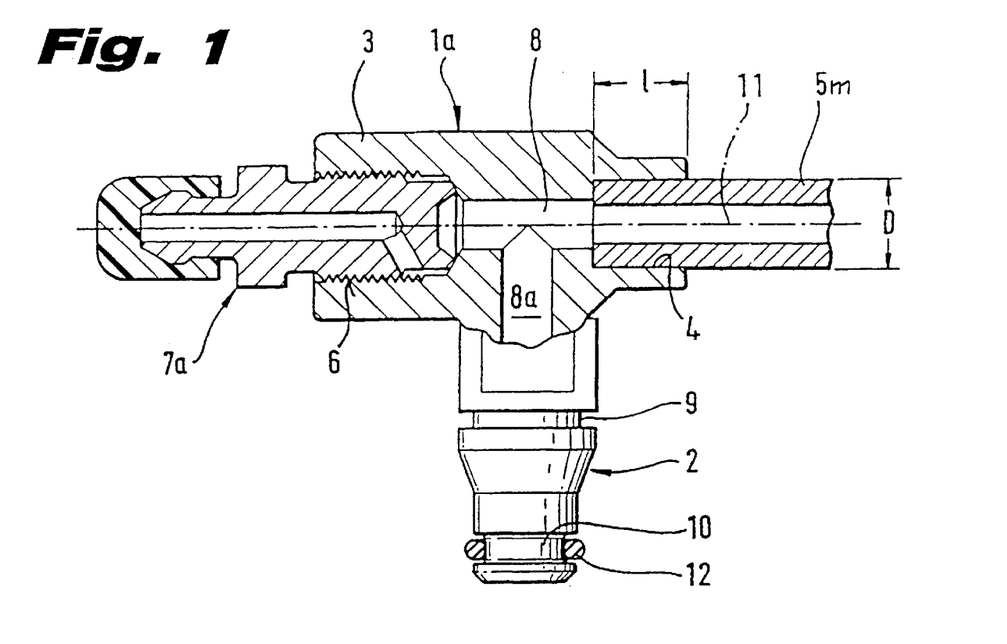
FIG. 1 is a partly elevational and partly axial sectional view of a fitting which is designed and produced in accordance with one embodiment of the present invention, of a connection between one section of the fitting and a hydraulic line, and a connection between another section of the fitting and a relief valve.
Figures 4, 6, 7:
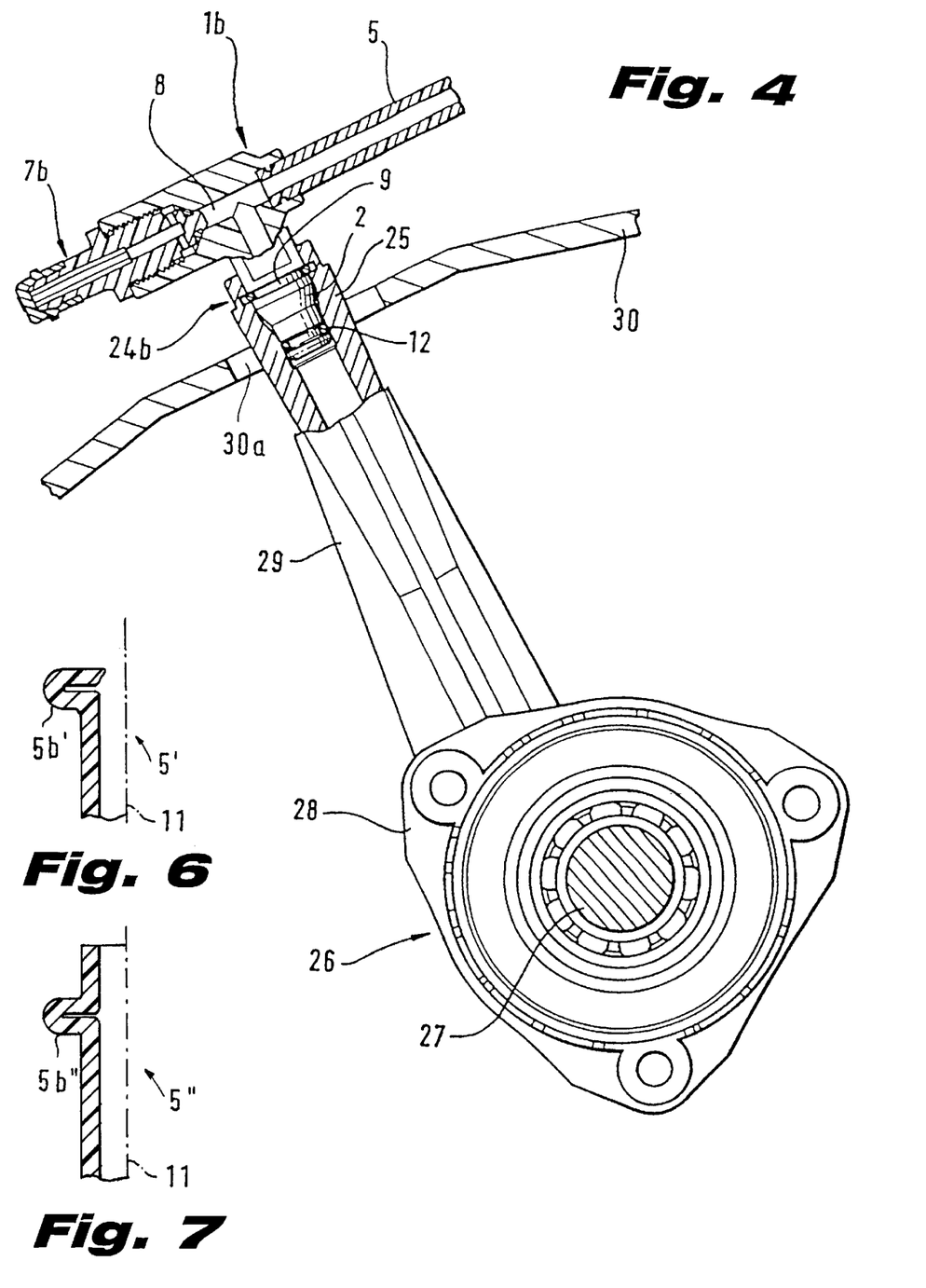
FIG. 4 is a partly end elevational and partly transverse sectional view of a slave cylinder and a connection between an extension of the cylinder housing and a fitting of the type shown in FIG. 2.
FIG. 6 is an enlarged fragmentary axial sectional view of a hydraulic line which constitutes a modification of that shown in FIG. 1 as well as of that shown in FIGS. 2 to 5.
FIG. 7 is a similar fragmentary axial sectional view a hydraulic line constituting a modification of the hydraulic line shown in FIG. 6.
Figure 5:
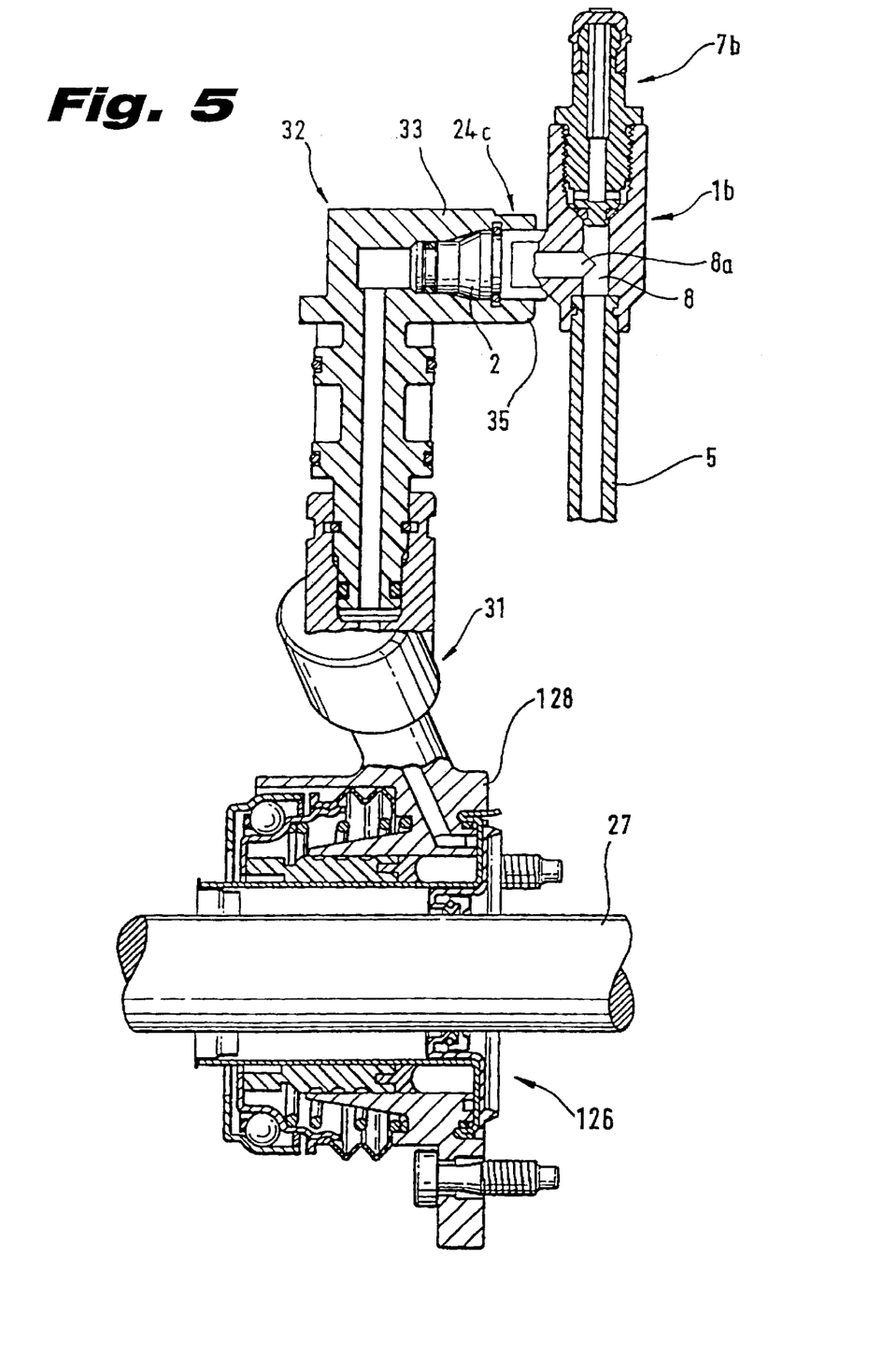
FIG. 5 is a partly elevational and partly sectional view of a slave cylinder having an adapter which is sealingly coupled to a fitting of the type shown in FIG. 2.

Referring to FIG. 1, there is shown a T-shaped metallic fitting 1a which is constructed and configured in accordance with one embodiment of the present invention and can be utilized between a hydraulic line 5m (hereinafter referred to as conduit for short) and (a) a master cylinder 18 (FIG. 3), (b) a slave cylinder 26 (FIG. 4) or (c) an adapter 32 (FIG. 5). The adapter 32 of FIG. 5 forms part of a modified slave cylinder 126; however, such adapter can also form part of a master cylinder similar or analogous to the master cylinder 18 of FIG. 3.

Certain parts or sections of the fitting 1a form part of a coupling which can connect the conduit 5m with the constituent 18, 26 or 32 of a hydraulic clutch release mechanism. A further section or portion of the fitting 1a is separably connected with a relief valve 7a. The T-shaped fitting 1a includes a so-called run 3 which is the straight portion of the tee, and a so-called branch or cross member 2 which is inclined (at right angles) relative to the run 3 and is located midway between the end portions of the latter.

The aforementioned coupling includes a first section constituted by the right-hand end portion of the run 3 of the fitting 1a, a second section constituted by the branch 2 of the fitting 1a, and a third section forming part of the master cylinder 18 or of the slave cylinder 26 or constituted by the adapter 32 of the slave cylinder 126. The first section of the coupling including parts of the fitting 1a is provided with an axial recess or bore 4 having a depth I and receiving the end portion of the conduit 5m. The diameter D of the end portion of the conduit 5m at most equals the depth I. The axis 11 of the illustrated conduit 5m coincides with the axis of the run 3 of the fitting 1a and with the axis of the relief valve 7a when the fitting is properly assembled with the parts 5m and 7a.

The axial channel or bore 8 of the run 3 of the fitting 1a communicates with the axial channel of the conduit 5m as well as with the axial channel 8a of the second section (branch 2) of the aforementioned coupling. The conduit 5m can be a press fit in or it can be welded, soldered or otherwise sealingly affixed to the right-hand end portion of the run 3 so that the end portion of the conduit extends all the way or close to the bottom wall in the recess 4. The body of the relief valve 7a has an external thread mating with an internal thread provided in a tapped bore or hole 6 of the left-hand end portion of the run 3. The tapped bore or hole 6 communicates with the left-hand end of the channel 8.

Figure 3:
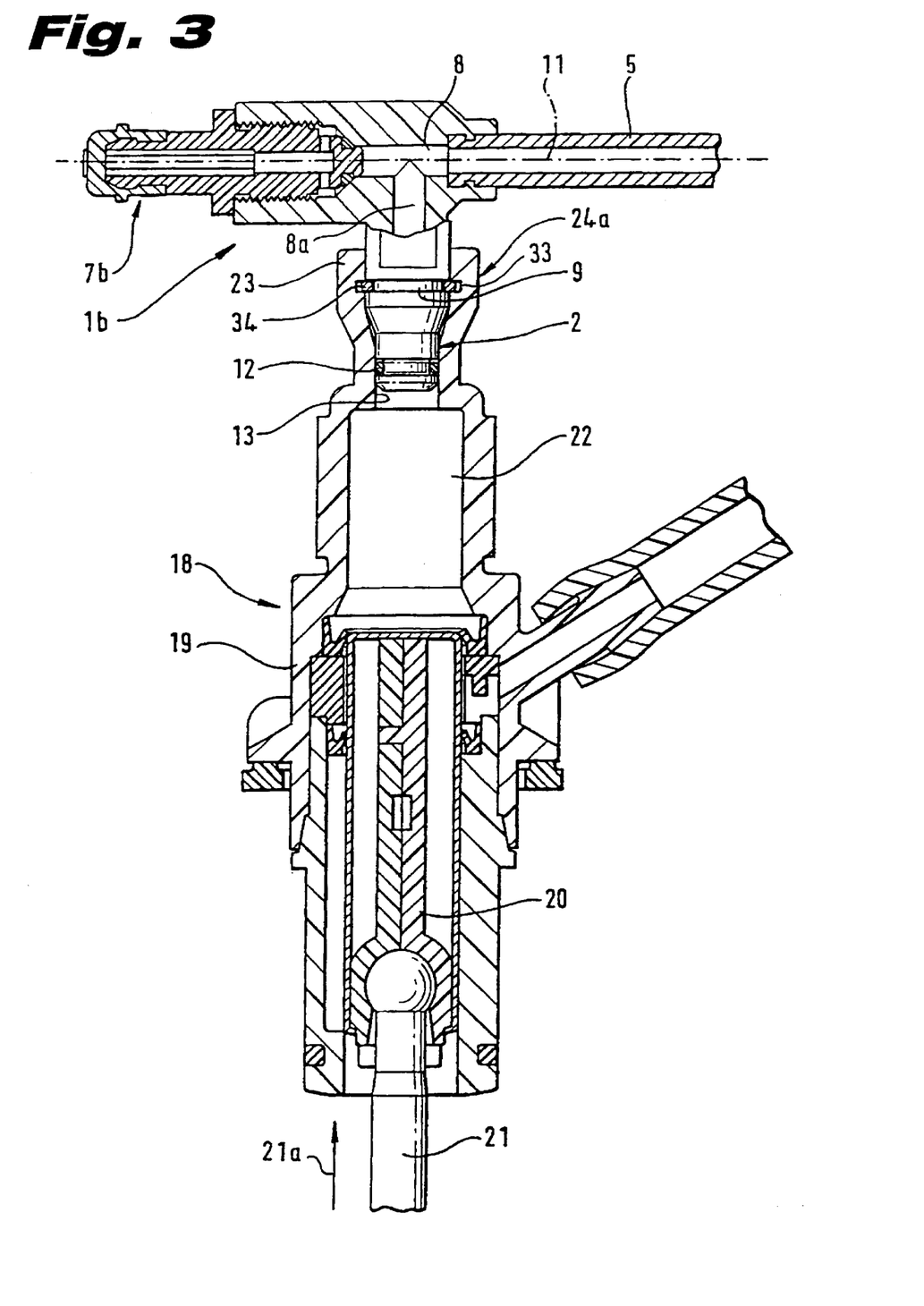
FIG. 3 is an axial sectional view of a master cylinder and of its connection with a fitting similar to that shown in FIG. 2.

The second section 2 of the coupling (i.e., the branch of the fitting 1a) is provided with two circumferentially complete axially spaced-apart external grooves 9 and 10. The groove 10 receives a resilient ring-shaped sealing element 12 which can prevent leakage between the second section 2 and the third section of the coupling. Reference may be had to FIG. 3 which shows the element 12 in sealing engagement with a coupling section 23 forming part of the housing 19 of the master cylinder 18. The groove 9 can receive a retainer 34 (refer again to FIG. 3) in the form of a resilient split ring which tends to expand and to snap into an annular internal recess 33 of the third section 23 when the junction or joint 24a between the male section 2 and the female section 23 is fully assembled. Thus, the joint between the right-hand portion of the run 3 (the first section of the coupling) and the adjacent end portion of the conduit 5m can be a press fit or a permanent (e.g., welded) joint. On the other hand, the joint between the second (2) and third (e.g., 23) sections of the coupling can be a connection which is separable and is or can be established by snap action.

The inner diameter of the groove 9 is greater than the inner diameter of the groove 10; to this end, the section or branch 2 of the fitting 1a includes several axially spaced-apart portions having different outer diameters. If the fitting 1a of FIG. 1 is assembled with the section 23 of the housing 19 forming part of the master cylinder 18 of FIG. 3, the elastic sealing element 12 engages the internal surface 13 surrounding the axial channel of the section 23.

FIGS. 2, 3, 4 and 5 show the configuration of a modified fitting 1b which is made, at least in part, of a suitable synthetic plastic material. The right-hand end portion of the fitting 1b has an axial recess 4 and an internal annular projection or rib 14 received (e.g., by snap action and/or otherwise) in a complementary external groove of the end portion of a plastic conduit 5 serving to convey hydraulic fluid from a plenum chamber (22) in a master cylinder (see the cylinder 18 in FIG. 3) to a slave cylinder (26 or 126) or from a slave cylinder to a hydraulically operated clutch (the case 30 of a clutch is shown in FIG. 4). As will be described in greater detail hereinafter, the joint between the plastic parts 1b and 5 can be made in a suitable injection molding or an analogous machine, e.g., by resorting to a composite tool which is preferably provided with means for properly centering the end portion of the plastic conduit 5 preparatory to the forming of the right-hand end portion of the run 3 forming part of the fitting 1b. The rib 14 is or can be formed simultaneously with the making of the fitting 1b.

Figure 2:
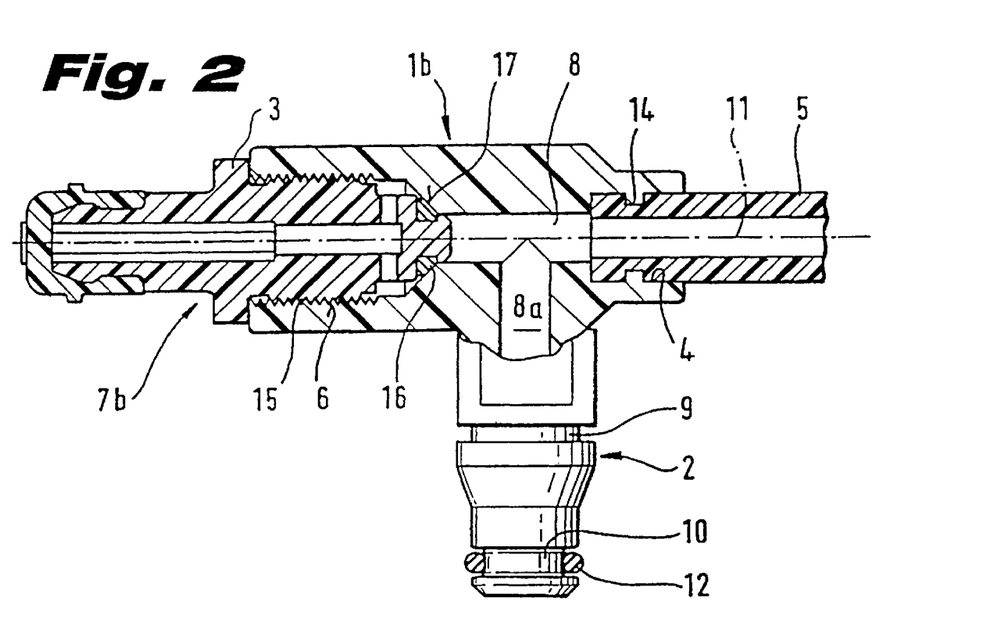
FIG. 2 is a similar view of a modified fitting and of modified connections between the modified fitting on the one hand, and a hydraulic line and a relief valve on the other hand.

The left-hand end of the run 3 of the fitting 1b is provided with a tapped hole 6 bounded by an internal thread 15 meshing with the external thread on the plastic body of a modified relief valve 7b. The innermost or deepmost portion of the tapped hole 6 of the run 3 of the plastic fitting 1b is bounded by a conical internal surface 17 abutting an elastic sealing ring 16 which is recessed into an external annular groove of the conical inner end portion of the plastic body of the relief valve 7b.

The configuration of the branch 2 (the second section of the coupling including the right-hand end portion of the run 3 of the fitting 1b) has been described hereinbefore, i.e., this section or run is designed to fit into the third section of the coupling, such as the female part 23 of the housing 19 of the master cylinder 18 shown in FIG. 3. The junction or joint 24a including the sections 2, 23 of the coupling including parts of the fitting 1b is separable in response to expulsion of the elastic split ring 34 from the internal groove 33, and such joint is sealed by the element 12 which is received in the internal groove 9 of the male section 2 and sealingly engages the internal surface 13 of the female section 23.

The means for expelling pressurized hydraulic fluid from the plenum chamber 22 of the master cylinder 18 into the channels 8a, 8 and thence into the conduit 5 comprises a piston 20 which is reciprocable in the housing 19 of the cylinder 18. The piston rod 21 of the master cylinder 18 can be depressed by a clutch pedal (not shown) to thus disengage the clutch by forcing pressurized hydraulic fluid to flow into the conduit 5. The housing 19 of the master cylinder 18 is or can be fixedly secured to a stationary part under the hood of a motor vehicle. The piston 20 is reciprocable in and sealingly engages the internal surface of the housing 19. The piston rod 21 has a spherical head which can swivel in a complementary socket of the piston 20, i.e., the parts 20, 21 are connected to each other by a universal joint. The arrow 21a indicates the direction of movement of the piston rod 21 when the clutch pedal is actuated in a sense to disengage the clutch (such as a friction clutch) by expelling hydraulic fluid from the plenum chamber 22 into the conduit 5.

The branch (plug) 2 of the fitting 1b is rotatable in the socket (female third section) 23 of the coupling 24a and/or vice versa; this is desirable and advantageous because the ultimate orientation of the conduit 5 and fitting 1b relative to the housing 19 of the master cylinder 18 can be such that the conduit 5 is not subjected to any, or any appreciable, bending, twisting and/or other deforming stresses.

FIG. 4 is a partly end elevational and partly transverse sectional view of the aforementioned slave cylinder 26. The housing 28 of this cylinder is coaxial with and surrounds a rotary torque transmitting member 27, e.g., a shaft which transmits torque between the combustion engine and the change-speed transmission in the power train of a motor vehicle. A radial extension 29 of the housing 28 includes the third section 25 of a coupling between the slave cylinder 26 and the conduit 5. Such coupling further includes a male second section 2 which constitutes the branch of the fitting 1b and a first section which is the right-hand end portion of the run 3 of the fitting. The length of the hollow extension 29 depends upon the distance between the torque transmitting member 27 and that end portion of the conduit 5 which is preferably permanently connected with the T-shaped fitting 1b. The friction clutch which is controlled by the slave cylinder 26 is confined in the case 30; the latter has an opening 30a for the section 25 of the coupling between the slave cylinder 26 and the conduit 5. The parts 2 and 25 together constitute a separable junction 24b between the extension 29 (i.e., the housing 28) and the male section 2 of the fitting 1b.

The construction of the fitting 1b is or can be identical with that of the similarly referenced fitting shown in FIGS. 2, 3 and 5.

FIG. 5 shows the manner in which the fitting 1b is separably coupled to the aforementioned L-shaped adapter 32 of the housing 128 of the modified slave cylinder 126. The housing 128 surrounds the rotary torque transmitting member 27 and further includes an extension 31 which is of one piece with the adapter 32. The tubular portion 33 of the adapter 32 constitutes the third section of the coupling which connects the housing 128 with the conduit 5; this tubular portion 33 forms part of a separable junction 24c which further includes the male second section 2 of the coupling, i.e., the branch of the T-shaped fitting 1b. The branch 2 is separably received in the outlet 35 of the tubular portion 33 of the extension 32.

The adapter 32 can be said to constitute an extension of the extension 31 of the housing 128 forming part of the slave cylinder 126. The extension 31 serves as a means for bridging the space or gap between the housing 128 and the case of the friction clutch (such as the case 30 shown in FIG. 4).

It is further within the purview of the present invention to employ a conduit which replaces the conduit 5m or 5 and includes a metallic tubular core and a tubular plastic envelope or sleeve surrounding the core. For example, such modified conduit can comprise a core which constitutes a steel pipe and an envelope made of PA 12. The end portion of such composite conduit is insertable into a tool forming part of an injection molding machine which is utilized to make the fitting 1b.

An important advantage of the improved hydraulic clutch release mechanism is that the end portion of the conduit 5 or 5m can be installed in close proximity to the housing of a master cylinder or a slave cylinder, i.e., much closer to the axis of such cylinder than in heretofore known clutch release mechanisms. The distance between the axis of the cylinder and the end portion of the conduit 5 or 5m will depend upon the angle at which the joint between the conduit and the fitting is positioned relative to the external surface of the cylinder (such as the cylinder 18, 26 or 126). In FIG. 3, the axis 11 of the end portion of the conduit 5 is normal to the axis of the cylinder 18; in FIG. 4, such axis is tangential to the axis of the cylinder 26; and in FIG. 5, such axis is normal to the axis of the cylinder 126.

Another important advantage of the improved clutch release mechanism is that its fitting 1a or 1b (or an analogous fitting) can be readily assembled with the conduit 5 or 5m (or an analogous hydraulic line) as well as with the housing of a master cylinder or slave cylinder in a simple and time-saving operation, with a requisite degree of reliability, and in a leakproof manner. The connection between the conduit and a cylinder can be established by utilizing one hand which can force the male section (such as 2) into the female section (such as 23) of the coupling. This, too, contributes to simplicity of the establishment of a fluid tight connection between a friction clutch and a master cylinder or a slave cylinder in a time-, space- and labor-saving manner. Still further, the nature of the improved coupling is such that it permits for automatic adjustment of the end portion of the conduit 5 or 5m (or an analogous conduit) relative to a master cylinder or a slave cylinder in order to eliminate or reduce stresses upon the junction between the conduit and the fitting and/or upon the junction between the fitting and the housing of the master cylinder or slave cylinder.

In accordance with a presently preferred embodiment, the fitting (1b) is made of a synthetic plastic material which is but need not always be identical with that of the conduit (5). For example, the fitting 1b can be made of fiber-reinforced polyamide, and the conduit 5 can be made of non-reinforced polyamide. The plastic material is preferably selected with a view to permit for the making of the part 5 and/or 1b in an injection molding machine. It is even possible to make the conduit of one piece with the plastic fitting. This simplifies the establishment of a reliable junction between such parts.

An advantage of making the fitting 1b from a suitable plastic material is that the fitting can be made at a relatively low cost. The cost is further reduced if the conduit 5 is made of a plastic material which is compatible (e.g., identical) with the material of the fitting. It has been found that a highly satisfactory material for the making of the conduit 5 is polyamide and that a highly satisfactory material for the fitting 1b is the aforementioned fiber-reinforced polyamide. Such fitting can be non-separably coupled with the conduit, for example, in an injection molding machine wherein the right-hand end portion of the run 3 of the T-shaped fitting 1b (i.e., the first section of the coupling) is bonded to the left-hand end face and to the circumference of the left-hand end portion of the conduit 5 (all as seen in any of the FIGS. 2, 3 and 4). The making of such bond between the fitting 1b and the conduit 5 is a rather simple undertaking which necessitates the utilization of a relatively simple composite tool. As a rule, the bond between the fitting 1b and the conduit 5 is satisfactory if the depth of the recess 4 at least equals the outer diameter of that end portion of the conduit which is to enter the recess. However, the ratio of I to D can be changed if necessary, e.g., in dependency upon the maximum pressure of hydraulic fluid which is to flow between the channel 8a and (via channel 8) the interior of the conduit 5.

In order to ensure the establishment of a satisfactory joint between the conduit 5 and the first section of the fitting 1b, the tool which forms part of the injection molding machine and is to be used for the making of the fitting 1b preferably comprises a core-like portion which enters the end portion of the conduit 5 and centers the latter during the making of the fitting. Such tool further comprises two or more parts which define a space for the injection of plastic material which is to form the first section of the plastic fitting 1b. The just described procedure results in the making of a fitting-conduit combination wherein the end portion of the conduit is automatically centered in the adjacent portion of the fitting during the making of the fitting in the injection molding machine.

The just described tool is preferably constructed and configured in such a way that it finishes the left-hand end portion of the run 3 of the fitting 1b simultaneously with the making of the (first) section which is bonded to the conduit 5. For example, the tool can make the channel 8 so that it ends at the conical internal surface 17 of the annular seal 16. Still further, the tool of the injection molding machine can provide the branch 2 with the external grooves 9 and 10 one (9) of which is used to facilitate the establishment of the junction 24a or 24b or 24c, and the other (10) of which serves to receive a portion of the resilient annular sealing element 12.

If the conduit 5 and the fitting 1b are made as two discrete parts, the bonding of such parts to each other can be carried out in a suitable ultrasonic welding machine and/or by resorting to a suitable adhesive. All that counts is to select a procedure which can be resorted to in order to establish a non-separable connection between the parts 1b and 5 (provided, of course, that such connection is desirable for convenient, simple, time-saving and otherwise advantageous mounting of a fitting, conduit and relief valve combination in a hydraulic clutch release mechanism).

Injection molding machines for the making of permanently coupled or joined fitting-conduit combinations have been found to be particularly useful when such combinations are to be produced in large or huge quantities and the establishment of close (zero) tolerances between the first sections of the couplings including portions of the fittings and the surrounded end portions of the conduits constitutes a desirable feature of the finished clutch release mechanisms.

In accordance with still another feature of the instant invention, the conduit (such as the plastic conduit 5 of FIGS. 2 to 5) can be subjected to a so-called dolling treatment to constitute a conduit 5' which exhibits a circumferential corrugation 5b' (FIG. 6) or a conduit 5" having a circumferentially complete corrugation 5b" (FIG. 7) The corrugation 5b' or 5b" extends radially outwardly beyond the peripheral surface of the major part of the end portion which is received in the recess 4 of the fitting 1b. Such corrugation (or corrugations) ensures (or ensure) the establishment of an even more reliable junction or joint between the end portion of the conduit and the respective end portion of the run 3 of the fitting 1b. More specifically, the corrugation or corrugations further enhances or enhance the ability of the conduit and fitting to assume any one of a practically infinite number of different angular and/or other positions relative to each other. The aforediscussed dolling operation can involve an upsetting of the respective part of the end portion of the conduit 5' or 5", or another form of treatment which results in radial expansion of one or more selected parts of such conduit to provide it with the corrugation(s) 5b' or 5b'.

In accordance with a further embodiment of the present invention which constitutes a modification of the features shown in FIGS. 6 and 7 but is not specifically shown in the drawings, that end portion of a conduit which is to be received in a recess of the fitting 1b is stepped, e.g., by providing it with two or more neighboring or axially spaced-apart annular portions having different outer diameters. Such stepped end portion is received in a complementary recess of the fitting. An advantage of the just described undertaking (as well as of the corrugations 5b' and 5b") is that the area of contact between the end portion of the conduit and the surface surrounding the recess in the fitting is increased to thus establish a permanent bond which is even stronger than that shown in FIG. 2, 3, 4 or 5. In fact, the external surface of the end portion of the conduit 5 shown in FIG. 2 is also stepped but in the opposite direction, i.e., the peripheral surface of the end portion of the conduit 5 is stepped radially inwardly rather than radially outwardly. The bonding operation can be carried out with advantage in an ultrasonic welding machine.

In the absence of any of the aforedescribed undertakings involving those shown in FIGS. 6 and 7 and described as modifications of those shown in FIGS. 6 and 7, the integral bonding of the conduit 5 to the fixture 1b simply involves the step of carrying out the injection molding operation in such a way that the material of the fixture fills the recess of the conduit 5 to thus form the internal rib 14 (or to form two or more such ribs if the peripheral surface of the conduit 5 is formed with two or more grooves which may but need not be circumferentially complete grooves). For example, the peripheral surface of the end portion of the conduit can be provided with two or more identical or different recesses which are distributed in such a way that they are filled with the material of the respective end portion of the run of the fitting.

The making of a relief valve (7b) having a body which is provided with an external thread to mate with the internal thread 15 in the tapped hole 6 of the fitting 1b constitutes an additional feature which contributes to lower cost of the combination of parts 1b and 7b. Such connection, in combination with a suitable sealing ring 16, has been found to be highly satisfactory in most instances where the fitting must be equipped with a relief valve.

Composite tools which can be modified for use in a molding machine capable of turning out fittings 1b or analogous fittings, as well as combinations of fittings 1b and conduits 5 (with one end portion of the conduit permanently connected or joined to the respective end portion of the run of the fitting), are described in U.S. Pat. No. 5,879,599 granted May 9, 1999 to Inoue et al. for "METHOD OF MOLDING GOLF BALLS".

Machines which can be adapted for the making of the improved fittings, especially for the making of plastic fittings and/or of combinations of plastic fittings with plastic or plastic-containing conduits are distributed, for example, by DEMAG Krauss Maffei which is a subsidiary of ATECS AG, a corporation of Federal Republic Germany. As a rule, or at least in many instances, composite tools which are used in injection molding and analogous machines capable of being utilized for the making of the improved fittings or combinations of fittings with valves and/or conduits are furnished by subcontractors in accordance with the specifications from the purchaser of the molding machine.

The aforediscussed U.S. '657 patent to Compton et al. discloses a modular hydraulic control apparatus which differs from the hydraulic clutch release mechanism of the present invention in the aforediscussed respects as well as on the additional ground that it is filled with a supply of fluid prior to delivery to the ultimate user (such as an automobile assembly plant). On the other hand, the clutch release mechanism of the present invention is intended to receive or can receive and confine hydraulic fluid subsequent to its installation in the power train or drive train of a motor vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydraulic clutch release mechanisms for use in the power trains of motor vehicles and, therefore, such adaptations should and are intended to be comprehended within the meaning and range of equivalence of the appended claims.

What is claimed is:

1. A hydraulic clutch release mechanism, comprising:
   a cylinder having a housing defining a chamber, and a piston reciprocable in said housing;
   a conduit having an end portion; and
   a quick-connect coupling between said conduit and said housing, including a fitting having a channeled first section communicatively connected with said end portion and a channeled second section inclined relative to and communicating with said first section, and a channeled third section provided on said housing, one of said second and third sections sealingly receiving the other of said second and third sections and establishing therewith a path for the flow of fluid between said chamber and said conduit by way of said first section.

2. The release mechanism of claim 1, wherein said cylinder is a master cylinder.

3. The release mechanism of claim 1, wherein said cylinder is a slave cylinder.

4. The release mechanism of claim 1, wherein said third section is an adapter on said housing.

5. The release mechanism of claim 1, wherein said fitting is a tee including a run and a branch, said first section forming part of said run and said second section including said branch.

6. The release mechanism of claim 5, further comprising a relief valve provided in said run of said tee.

7. The release mechanism of claim 1, further comprising a relief valve provided in said fitting and arranged to open in response to a rise of fluid pressure in the channels of said first and second sections above a preselected value.

8. The release mechanism of claim 1, wherein at least one of said conduit and said fitting contains a plastic material.

9. The release mechanism of claim 8, wherein at least one of said conduit and said fitting is an injection molded part.

10. The release mechanism of claim 8, wherein said conduit consists of polyamide and said fitting contains polyamide.

11. The release mechanism of claim 8, wherein said fitting consists of fiber-reinforced polyamide.

12. The release mechanism of claim 8, wherein the plastic material of said conduit is identical with the plastic material of said fitting.

13. The release mechanism of claim 1, wherein said first section includes means for non-separably connecting said conduit to said fitting.

14. The release mechanism of claim 13, wherein said fitting is an injection molded part made in a machine having a composite injection molding tool including means for centering said end portion prior to molding said first section around the centered end portion.

15. The release mechanism of claim 14, further comprising a relief valve provided in said fitting and arranged to open in response to a rise of fluid pressure in said first and second sections to a preselected value, said tool further having means for molding a portion of said fitting around a portion of said valve, for providing a second portion of the fitting with a recess for the end portion of said conduit, and for providing paths for the flow of fluid between the channels of said first and second sections as well as between at least one of said last named channels and said valve.

16. The release mechanism of claim 1, wherein said end portion has an outer diameter D and said first section has a recess having a depth I, said end portion being received in said recess and said depth being at least equal to said diameter.

17. The release mechanism of claim 1, wherein said conduit comprises a metallic pipe and a plastic envelope surrounding said pipe.

18. The release mechanism of claim 1, wherein said end portion of said conduit and at least said first section of said fitting contain a weldable plastic material, said first section being ultrasonically welded to said end portion.

19. The release mechanism of claim 18, wherein said end portion of said conduit is corrugated as a result of a radially outwardly oriented treatment including one of upsetting and stretching.

20. The release mechanism of claim 18, wherein one of said end portion of said conduit and said first section has at least one external projection and the other of said end portion of said conduit and said first section has at least one internal socket for said at least one external projection.

21. The release mechanism of claim 20, wherein said at least one external projection is a circumferentially complete collar.

22. The release mechanism of claim 1, wherein said end portion of said conduit and said first section of said fitting are interfitted by snap action.

23. The release mechanism of claim 22, wherein said other of said second and third sections of said coupling is provided with a discrete retainer and said one of said second and third sections of said coupling has a socket receiving said retainer by snap action in response to insertion of said other of said second and third sections into said one of said second and third sections.

24. The release mechanism of claim 1, further comprising a relief valve having an externally threaded body of a plastic material, said fitting having a tapped hole receiving said externally threaded body and further comprising at least one annular sealing element received in said hole and sealingly engaging said fitting and said body.

* * * * *